United States Patent Office 3,462,515
Patented Aug. 19, 1969

3,462,515
VINYL POLYMER GRAFTS ON POLYCARBONATES
James E. Cantrill, Pittsfield, Mass., assignor to General Electric Company, a corporation of New York
No Drawing. Filed Jan. 17, 1967, Ser. No. 609,737
Int. Cl. C08g *17/14, 39/10*
U.S. Cl. 260—873                9 Claims

ABSTRACT OF THE DISCLOSURE

A graft copolymer consisting of an aromatic polycarbonate backbone having vinyl polymer units pendant thereon, which vinyl polymer units may be for example polystyrene polymer, and a process for preparing the graft copolymer, which process comprises reacting an aromatic polycarbonate with a vinyl monomer by a free radical polymerization reaction.

---

This invention relates to a thermoplastic graft copolymer and in particular to a thermoplastic graft copolymer consisting of a polycarbonate backbone with vinyl polymer units pendant thereon and to a process for preparing the thermoplastic graft copolymers of this invention.

In recent years there has been a great deal of effort devoted to the preparation of thermoplastic graft copolymers because of the desirable properties obtained through graft copolymerization. A graft copolymer generally consists of a polymer backbone with one or more different types of materials pendant thereon. However, graft copolymers containing polycarbonate units are not generally known.

Therefore, it is an object of this invention to provide a novel thermoplastic graft copolymer containing a polycarbonate backbone.

Another object of this invention is to provide a process for preparing the thermoplastic graft copolymers of this invention.

Still a further object of this invention is to provide a composition consisting of an admixture of a thermoplastic graft copolymer with other polymers.

These and other objects of this invention will become apparent from the following detailed description thereof.

Briefly, according to this invention, the foregoing and other objects are attained by reacting an aromatic carbonate polymer with a vinyl monomer to form a graft copolymer consisting of a polycarbonate backbone having vinyl polymers pendant thereon. The reaction for preparing the graft copolymer consists of reacting the polycarbonate backbone with the vinyl monomer to produce a carbonate polymer backbone having vinyl polymer units pendant thereon.

The following examples are set forth to illustrate more clearly the principle and practice of this invention to those skilled in the art. Unless otherwise specified, where parts or percents are mentioned, they are parts or percents by weight.

EXAMPLE I

To a solution of 50 grams of a polycarbonate in 250 grams of methylene chloride, which polycarbonate is prepared from 2,2-bis(4-hydroxyphenyl)propane hereinafter referred to as (bisphenol-A) and phosgene and having an intrinsic viscosity of 0.58 deciliter per gram, as measured in dioxane at 30° C., 100 grams of styrene monomer and 0.25 gram of 4,4'-azo-bis-isobutyronitrile are added. The solution while stirring is added to a solution of 1.75 grams of polyacrylic acid in 315 grams of water. The resulting mixture is heated to remove the methylene chloride while bubbling nitrogen through the solution, and polymerized at about 70° C. for about 14 hours under a nitrogen atmosphere. After cooling, the resulting polymer is filtered and found to have an intrinsic viscosity of 0.55 deciliter per gram as measured in dioxane at 30 C.

The resulting polymer formed is a graft copolymer consisting of a polycarbonate backbone with styrene polymer units pendant thereon. To establish that the polymer is a graft copolymer, the following analytical procedure is employed. A 5-gram sample of the copolymer is exhaustively extracted with cyclohexane producing 2.05 grams of pure polystyrene as determined by infrared spectrum analysis. The residue weighed 2.85 grams and contained 8% by weight of polystyrene as determined by infrared spectrum analysis. Since this is nonextractable polystyrene, it must be grafted onto the bisphenol-A polycarbonate.

A 10% weight to volume solution of the graft copolymer obtained in methylene chloride is cloudy but did not separate into discrete layers after standing at room temperature for six days. A 10% weight to volume solution of a 50–50 mixture of polystyrene and bisphenol-A polycarbonate in methylene chloride separated into two discrete layers after standing for one hour.

The tensile heat distortion (measured by ASTM procedure D1637–61) of a cast film of the copolymer is 101° C.

EXAMPLE II

Part A

A solution of 120 grams of poly[bisphenol-A carbonateco-2,2-bis(3-methyl-4-hydroxyphenyl)propane carbonate] which contains 20 mole percent of 2,2-bis(3-methyl-4-hydroxyphenyl)propane carbonate, and 32 grams bromine in 1500 grams methylene chloride is irradiated with an ultraviolet light source (sunlamp) for 24 hours. The polymer is precipitated and washed with methanol. It contains 3 mole percent bromine and has an intrinsic viscosity as measured in chloroform at 25° C. of 0.51 deciliter per gram.

Part B

Example I is repeated except that 50 grams of the brominated carbonate copolymer of Part A above is employed herein in place of the 50 grams of the polycarbonate employed in Example I. The resulting polymer has an intrinsic viscosity as measured in chloroform at 25° C. of 0.76 deciliter per gram.

To establish that the polymer is a graft copolymer consisting of brominated carbonate copolymer backbone with styrene polymer units pendant thereon, the following analytical procedure is used. Fractional precipitation from dioxane with heptane separates the polymer into 11% ungrafted brominated poly[bisphenol-A carbonate-co-2,2-bis(3-methyl-4-hydroxyphenyl)propane carbonate], 36% graft copolymer and 53% polystyrene. The 36% is a graft copolymer since the styrene polymer can only graft onto the carbonate copolymer backbone. It cannot form a block copolymer therewith.

EXAMPLE III

Example I is repeated except that in place of the 100 grams of styrene monomer employed therein, 50 grams of styrene monomer and 50 grams of an acrylonitrile monomer are employed herein. The resulting polymer is a graft copolymer having a polycarbonate backbone with styrene-acrylonitrile polymer units pendant thereon as determined by the same analytical procedure employed in Example I.

EXAMPLE IV

A solution of 70 grams of a bisphenol-A polycarbonate, 30 grams butyl methacrylate (containing 10 p.p.m. hydroquinone monomethyl ether) and 0.1 gram 4,4'-azobisisobutyronitrile in 500 g. methylene chloride is refluxed at 41° C. for about 6 hours. The polymer is precipitated and washed with methanol. The resulting copolymer has an intrinsic viscosity as measured in chloroform at 25° C. of 0.61 deciliter per gram.

To establish that the polymer so formed is a graft copolymer consisting of a polycarbonate backbone with butyl methacrylate polymer units pendant thereon, the following analytical procedure is employed. Exhaustive extraction of the copolymer with isopropanol isolated less than 1% of polybutyl methacrylate. A 10% weight to volume solution of the copolymer in methylene chloride is cloudy but does not separate into discrete layers after standing at room temperature for six days. A 10% weight to volume solution of a mixture of 25% polybutyl methacrylate and 75% bisphenol-A polycarbonate separated into discrete layers after one hour. The tensile heat distortion as measured by ASTM procedure D1637–61 of a cast film of the copolymer was 216° C. The tensile heat distortion of bisphenol-A polycarbonate is 149° C. and of polybutylmethacrylate is approximately 25° C.

This invention is directed to a novel thermoplastic graft copolymer consisting of an aromatic carbonate polymer backbone with vinyl polymer units pendant thereon. In addition, the invention is also directed to a process for preparing the thermoplastic graft copolymers of this invention. The vinyl polymer units pendant on the polycarbonate backbone are polymer units which are selected from the group of polymers consisting of homopolymers or copolymers of esters of acrylic acid and methacrylic acid with alcohols of 1–20 carbon atoms, copolymers thereof with other vinyl monomers copolymerizable therewith, homopolymers of styrene and copolymers of styrene with other monomers copolymerizable therewith. As employed herein, styrene means substituted styrene as well. The critical feature of the instant invention is that the polymer backbone is a carbonate polymer with vinyl polymer units attached thereto. It is surprising that when reacting a polycarbonate in the presence of a vinyl monomer by a polymerization reaction with a free radical initiator, the resulting reaction product is a graft copolymer consisting of a polycarbonate backbone having vinyl polymer units pendant thereon.

In the practice of this invention, any of the aromatic polycarbonates can be employed as the polymer backbone. Generally, the aromatic polycarbonates are polymers of dihydric phenols. The dihydric phenols generally employed herein are dihydric phenols which contain as a sole reactive group two hydroxyl groups. Examples of some of the dihydric phenols are bisphenols such as 1,1-bis(4-hydroxyphenyl)methane, 2,2-bis(4-hydroxyphenyl)propane, 4,4-bis(4-hydroxyphenyl)heptane, etc.; dihydric phenol ethers such as bis(4-hydroxphenyl)ether, bis(3,5-dichloro-4-hydroxyphenyl)ether, etc; dihydroxy diphenyls such as p,p'-dihydroxydiphenyl, 3,3'-dichloro-4,4'-dihydroxydiphenyl, etc.; dihydroxyaryl sulfones such as bis(4-hydroxyphenyl)sulfone, bis(3,5 - dimethyl - 4 - hydroxyphenyl)sulfone, bis(3 - methyl - 5-ethyl - 4 - hydroxyphenyl)sulfone, etc.; dihydroxy benzenes, resorcinol, hydroquinone; halo- and alkyl-substituted dihydroxy benzenes such as 1,4-dihydroxy-2-chlorobenzene, 1,4-dihydroxy 2,3 - dichlorobenzene, 1,4 - dihydroxy - 3 - methylbenzene, etc.; and dihydroxy diphenyl sulfoxides such as bis(4 - hydroxyphenyl)sulfoxide, bis(3,5 - dibromo - 4 - hydroxyphenyl)sulfoxide, etc.

Generally, the polycarbonate employed herein is prepared by reacting a dihydric phenol with a carbonate precursor in the presence of a molecular weight regulator and acceptor. For example, a stoichiometric quantity of the carbonate precursor is fed into the system to react with the dihydric phenol to form the aromatic polycarbonate employed herein as the polymer backbone. The reaction is carried out generally at atmospheric pressure and preferably at a temperature of between 20° C–130° C. However, these conditions are not limiting factors in the process.

The molecular weight regulator employed in the reaction process is generally a monofunctional hydroxy compound such as phenol, cyclohexanol, methanol or parabromophenol. The amount employed is at least one mole of the molecular weight regulator per mole of the hydroxyl units of the dihydric phenol.

The carbonate precursor employed in the practice of this invention can be either a carbonyl halide or a haloformate. The carbonyl halides which can be employed herein are either carbonyl bromide, carbonyl chloride, carbonyl fluoride, etc.; or mixtures thereof. The haloformates suitable for use include bishaloformates of dihydric phenols (bischloroformates of hydroquinone, etc.), or glycols (bishaloformates of ethylene glycol, neopentyl glycol, polyethylene glycol, etc.). While other carbonate precursors will occur to those skilled in the art, carbonyl chloride known as phosgene is generally preferred.

As stated previously, the reaction is carried out in the presence of an acid acceptor, which acid acceptor may be either an organic or inorganic compound. A suitable organic acid acceptor as a tertiary amine includes such materials as pyridine, triethylamine, dimethylaniline, tributylamine, etc. The inorganic acid acceptor may be one which can be either a hydroxide, a carbonate, a dicarbonate or a phosphate of an alkali or alkaline earth metal.

As stated previously, this invention is also directed to a process for preparing the novel graft copolymers of this invention. The process comprises reacting a carbonate polymer as described previously and a vinyl monomer in the presence of a free radical initiator. The free radical initiator may be azonitriles or benzoyl peroxide or other free radical initiator. This type of polymerization reaction can be a bulk, solution, emulsion or suspension polymerization reaction.

The vinyl monomers employed herein are esters of acrylic acid and/or methacrylic acid with alcohols of 1–20 carbon atoms, styrene and mixtures of the above with other monomeric units capable of copolymerizing therewith. These monomeric units are unsaturated carboxylic acids and derivatives thereof as for example acrylic acid, methacrylic acid, acrylic and methacrylic acid monoesters of glycols, allylalcohol; alpha beta saturated carboxylic acid and derivatives thereof such as maleic anhydride; vinyl halides as for example vinyl chloride, vinyl bromine, vinylidene chloride; olefins as for example, ethylene, propylene, isobutylene; vinyl esters of carboxylic acids as for example vinyl acetate, vinyl benzoate, etc. However, the preferred vinyl polymer to be employed in the practice of this invention is either a styrene or a butyl methacrylate homopolymer prepared by employing a vinyl monomer.

In addition to the above, this invention is also directed to a composition consisting of in admixture (1) a thermoplastic graft copolymer consisting of an aromatic polycarbonate backbone with vinyl polymers pendant thereon, (2) an aromatic polycarbonate, and (3) a vinyl polymer. The vinyl polymer may be either a homopolymer or copolymer of an ester of acrylic or methacrylic acid with an alcohol of 1–20 carbon atoms, a copolymer thereof with other vinyl monomers that are copolymerizable therewith, a homopolymer of styrene or a copolymer of styrene with other monomers that are copolymerizable therewith. The polycarbonate is a polycarbonate of a dihydric phenol and a carbonate precursor. More specifically, the composition consists of at least three weight percent of the thermoplastic graft copolymer, at least ten weight percent of the polycarbonate and the balance thereof being the vinyl polymer.

The compositions of this invention are useful in preparing molded articles by injection molding, compression molding, etc. In addition, the compositions of this invention can be extruded into sheets or rods or can be cast from solutions into films or sheets.

It will thus be seen that the obpects set forth above, among those made apparent from the preceding description, are efficiently attained, and since certain changes may be made in carrying out the above process and in the compositions set forth without departing from the scope of this inveniton, it is intended that all matters contained in the above description shall be interpreted as illustrative and not in a limiting sense.

What is claimed is:

1. A thermoplastic graft copolymer consisting of an aromatic polycarbonate backbone with vinyl polymer units pendant thereon wherein the vinyl polymer units are selected from the group of polymers consists of homopolymers of the ester of acrylic acid, homopolymers of the ester of methacrylic acid, copolymers of the ester of acrylic acid and the ester of methacrylic acid with each other and with other vinyl monomers that are copolymerizable therewith, homopolymers of styrene and copolymers of styrene with other monomers that are copolymerizable therewith; said esters being the esters of acrylic acid and methacrylic acid with alcohols of 1–20 carbon atoms.

2. The composition of claim 1 wherein the aromatic polycarbonate is the polycarbonate of a dihydric phenol and a carbonate precursor.

3. The composition of claim 1 wherein the vinyl polymer contains at least 20 carbon atoms.

4. The composition of claim 1 wherein the vinyl polymer is a homopolymer of styrene.

5. The composition of claim 1 wherein the vinyl polymer is a homopolymer of butyl methacrylate.

6. A process for preparing a thermoplastic graft copolymer, which process comprises reacting in a free radical initiated polymerization reaction, an aromatic polycarbonate and a vinyl monomer wherein said vinyl monomer is selected from the group consisting of esters of acrylic and methacrylic acid with alcohols of 1–20 carbon atoms, styrene and mixtures thereof with other monomeric units capable of copolymerizing therewith.

7. The process of claim 6 wherein the polycarbonate is a halogenated copolymer of a dihydric phenol and an aliphatic substituted dihydric phenol.

8. The process of claim 6 wherein the aromatic polycarbonate is aliphatic substituted polycarbonate with said aliphatic groups containing 1–4 carbon atoms.

9. A composition consisting of a mixture of at least 3 weight percent of a thermoplastic graft copolymer of a polycarbonate containing vinyl polymer groups pendant thereon, at least 10 weight percent of an aromatic polycarbonate with the balance being the vinyl polymer; said vinyl polymer being selected from the group of polymers consisting of homopolymers of the ester of acrylic acid, homopolymers of the ester of methacrylic acid, copolymers of the ester of acrylic acid and the ester of methacrylic acid with each other and with other vinyl monomers that are copolymerizable therewith, homopolymers of styrene and copolymers of styrene with other monomers that are copolymerizable therewith; said esters being the esters of acrylic acid and methacrylic acid with alcohols of 1–20 carbon atoms.

References Cited

UNITED STATES PATENTS

| 3,124,554 | 3/1964 | Schnell et al. | 260—861 |
| 3,162,695 | 12/1964 | Grabowski | 260—873 |
| 3,239,582 | 3/1966 | Keskkula et al. | 260—873 |
| 3,278,639 | 10/1966 | Matray | 260—873 |
| 3,294,711 | 12/1966 | Von Bonin | 260—873 |

OTHER REFERENCES

Burlant; Blick and Graft Copolymers, 1960, pages 143, 144 and 145.

SAMUEL H. BLECH, Primary Examiner

J. T. GOOLKASION, Assistant Examiner

U.S. Cl. X.R.

260—47, 49